US012706852B2

(12) United States Patent
Ma et al.

(10) Patent No.: US 12,706,852 B2
(45) Date of Patent: Aug. 11, 2026

(54) NETWORK CONGESTION HANDLING METHOD, APPARATUS, AND DEVICE

(71) Applicant: Huawei Technologies Co., Ltd., Shenzhen (CN)

(72) Inventors: Tianyang Ma, Shenzhen (CN); Xuelian Deng, Shenzhen (CN); Tianxiang Chen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 18/361,042

(22) Filed: Jul. 28, 2023

(65) Prior Publication Data

US 2023/0370387 A1 Nov. 16, 2023

Related U.S. Application Data

(63) Continuation of application No. PCT/CN2022/072431, filed on Jan. 17, 2022.

(30) Foreign Application Priority Data

Jan. 30, 2021 (CN) ......................... 202110131460.8

(51) Int. Cl.
*H04L 47/263* (2022.01)
*H04L 47/25* (2022.01)
(Continued)

(52) U.S. Cl.
CPC ............ *H04L 47/263* (2013.01); *H04L 47/25* (2013.01); *H04L 47/26* (2013.01); *H04L 47/12* (2013.01)

(58) Field of Classification Search
CPC ....... H04L 47/263; H04L 47/12; H04L 47/27; H04L 47/26; H04L 47/10; H04L 47/11; H04L 47/29; H04L 47/25
See application file for complete search history.

(56) References Cited

U.S. PATENT DOCUMENTS 11,489,774 B2 * 11/2022 Liu ....................... H04L 43/026
2006/0193261 A1 8/2006 Sethi
(Continued)

FOREIGN PATENT DOCUMENTS

CN 110022264 A 7/2019
WO 2020236297 A1 11/2020

OTHER PUBLICATIONS

Curtis, Andrew R. et al., DevoFlow: Scaling Flow Management for High-Performance Networks, Proceedings of the ACM SIGCOMM 2011 Conference, Aug. 19, 2011, pp. 254-265. (Year: 2011).*
(Continued)

*Primary Examiner* — Gregory Todd
(74) *Attorney, Agent, or Firm* — Slater Matsil, LLP

(57) ABSTRACT

A network congestion handling method is provided. The method is applied to an HPC cluster including a plurality of hosts, and the plurality of hosts are connected via a network device. A transmit end obtains a first acknowledgment message including a network congestion scenario identifier. The network congestion scenario identifier is an identifier indicating a scenario in which network congestion occurs in a process in which the transmit end transmits data to a receive end, and the transmit end and the receive end are any two hosts in the plurality of hosts. Then, the transmit end adjusts a data sending rate of the transmit end based on the network congestion scenario identifier.

20 Claims, 6 Drawing Sheets

(51) Int. Cl.

| | |
|---|---|
| ***H04L 47/26*** | (2022.01) |
| *H04L 47/12* | (2022.01) |

(56) References Cited

U.S. PATENT DOCUMENTS

| | | | | |
|---|---|---|---|---|
| 2011/0211449 | A1 | 9/2011 | Attar et al. | |
| 2016/0308769 | A1* | 10/2016 | VerSteeg | H04L 43/0852 |
| 2016/0337240 | A1* | 11/2016 | Ellouze | H04L 47/24 |
| 2018/0063009 | A1* | 3/2018 | Dhanabalan | H04L 47/25 |
| 2020/0145340 | A1* | 5/2020 | Mula | H04L 47/12 |
| 2020/0187054 | A1* | 6/2020 | Osuga | H04W 28/10 |
| 2021/0211379 | A1* | 7/2021 | Liu | H04L 47/115 |
| 2021/0281524 | A1* | 9/2021 | Zhang | H04L 47/762 |
| 2021/0328930 | A1* | 10/2021 | Nikolaidis | H04L 47/115 |
| 2021/0344782 | A1* | 11/2021 | Shpigelman | H04L 47/12 |
| 2022/0006748 | A1* | 1/2022 | Pallagatti Kotrabasappa | H04L 47/803 |
| 2022/0014473 | A1* | 1/2022 | Matthews | H04L 43/0882 |
| 2022/0078118 | A1* | 3/2022 | Ao | H04L 47/26 |
| 2022/0182813 | A1* | 6/2022 | Esserman | H04W 8/186 |

OTHER PUBLICATIONS

Cisco, WRED-Explicit Congestion Notification, QoS: Congestion Avoidance Configuration Guide, Cisco IOS Release 15M&T, Mar. 28, 2014, pp. 1-10. (Year: 2014).*

* cited by examiner

NETWORK CONGESTION HANDLING METHOD, APPARATUS, AND DEVICE

CROSS-REFERENCE TO RELATED APPLICATIONS

This application is a continuation of International Application No. PCT/CN2022/072431, filed on Jan. 17, 2022, which claims priority to Chinese Patent Application No. 202110131460.8, filed on Jan. 30, 2021. The disclosures of the aforementioned applications are hereby incorporated by reference in their entireties.

TECHNICAL FIELD

This application relates to the field of network management technologies, and in particular, to a network congestion handling method and apparatus, and a device.

BACKGROUND

In a large-scale interconnection network, for example, a network with a large-scale high-performance computing (HPC) cluster topology structure, such as Dragonfly+ and Fattree, network congestion may occur due to large traffic carried by the network, complex traffic modes, limitations of the network topology structure, and the like. In other words, network transmission performance deteriorates due to an excessive quantity of data packets transmitted in the network. In the occurrence of network congestion, problems such as increase in a data transmission delay, data loss, decrease in a network device throughput, and even "congestion collapse" are likely to occur, severely affecting the network transmission performance.

Therefore, a network congestion handling method is urgently needed, to minimize impact of the network congestion on the network transmission performance in the occurrence of network congestion.

SUMMARY

This application provides a network congestion handling method and apparatus, and a device, to minimize impact of network congestion on network transmission performance in the occurrence of network congestion.

According to a first aspect, this application provides a network congestion handling method. The method may be applied to an HPC cluster including a plurality of hosts, and the plurality of hosts in the HPC cluster are connected via a network device, for example, connected via a device such as a router or a switch. When any one of the hosts sends data to another host, the host that sends the data is a transmit end, and the host that receives the data is a receive end. The transmit end may obtain a first acknowledgment message. The first acknowledgment message includes a network congestion scenario identifier, and the network congestion scenario identifier is an identifier indicating a scenario in which network congestion occurs in a process of transmitting data from the transmit end to the receive end. Then, the transmit end may adjust a data sending rate of the transmit end based on the network congestion scenario identifier.

In this way, in the occurrence of network congestion in the HPC cluster, the transmit end may targetedly alleviate, based on the network congestion scenario identifier, a network congestion problem in the network congestion scenario by adjusting the data sending rate of the transmit end, thereby reducing impact of the network congestion on network transmission performance of the entire high-performance computing cluster. In addition, for different network congestion scenarios, the transmit end may adjust the data sending rate of the transmit end according to different policies, so that different network congestion problems can be targetedly alleviated, and handling effect of the network congestion can be optimized.

In a possible implementation, the network congestion scenario may be specifically receive end network congestion. In this case, the network congestion scenario identifier in the first acknowledgment message includes a congestion factor, and the congestion factor indicates a congestion degree of the network congestion that occurs at the receive end. For example, a larger value of the congestion factor indicates a larger congestion degree of the network congestion that occurs at the receive end, while a smaller value of the congestion factor indicates a smaller congestion degree of the network congestion that occurs at the receive end. Optionally, the congestion factor may also be understood as an influencing factor that causes the receive end network congestion.

In this way, the transmit end may make, based on the congestion factor, different adjustment depending on degrees of receive end network congestion. For example, when the receive end network congestion is minor (a value of the congestion factor is small), the transmit end slightly reduces the data sending rate, so that a network throughput does not become excessively low after the transmit end reduces the data sending rate. When the receive end network congestion is serious (the value of the congestion factor is large), the transmit end significantly reduces the data sending rate, so that the network transmission performance is not seriously affected through significant reduction in the data sending rate. In addition, in actual application, small extra network bandwidth or even no extra network bandwidth is occupied by the receive end for feeding back the congestion factor. Compared with the case that the receive end directly feeds back a large amount of network congestion-related information to the transmit end, this can effectively reduce network link bandwidth occupied for network congestion alleviation, and improve link utilization can be improved.

In another possible implementation, a data flow transmitted by the transmit end to the receive end includes a first-type data flow and a second-type data flow, a length of the first-type data flow is greater than a length of the second-type data flow, and each data flow may include one or more data packets. When the transmit end adjusts the data sending rate of the transmit end based on the congestion scenario identifier, the transmit end may specifically reduce, based on the congestion factor, a data sending rate of sending the first-type data flow by the transmit end, but may not reduce a data sending rate of sending the second-type data flow by the transmit end.

In another possible implementation, the network congestion scenario is common transmission path network congestion. That the transmit end adjusts the data sending rate of the transmit end based on the congestion scenario identifier may be specifically that the transmit end obtains a priority of a to-be-sent data flow, and reduces, based on the priority of the to-be-sent data flow, a rate at which the transmit end sends the data flow. For example, when the priority of the to-be-sent data flow is high, the data sending rate of the transmit end is slightly reduced. When the priority of the to-be-sent data flow is high, the data sending rate of the transmit end is high, and even sending of a low-priority data flow may be stopped. In this way, impact on transmission of a high-priority data flow can be reduced as much as possible while the network congestion is alleviated.

In another possible implementation, the to-be-sent data flow includes a first data flow and a second data flow. A priority of the first data flow is higher than a priority of the second data flow. When sending the data flow, a rate at which the transmit end sends the first data flow is higher than a rate at which the transmit end sends the second data flow. In this way, a data flow with a higher priority can be transmitted to the receive end at a higher rate.

In another possible implementation, after the transmit end adjusts the data sending rate based on the congestion scenario identifier, the transmit end may further obtain a second acknowledgment message. The second acknowledgment message includes a smooth identifier, and the smooth identifier is an identifier indicating that no network congestion occurs in the process of transmitting data from the transmit end to the receive end. In this way, the transmit end may determine, based on the smooth identifier, that no network congestion currently exists, and the data sending rate of the transmit end may be increased.

In this way, the transmit end can quickly recover to a normal rate to transmit a data flow, thereby improving the network throughput. In addition, within one round trip time after the network congestion problem is resolved, the transmit end can increase the network throughput by restoring the data sending rate. In this way, a decrease in the network throughput caused by untimely recovery of the data sending rate can be avoided as much as possible.

According to a second aspect, this application provides another network congestion handling method. The method is applied to an HPC cluster that includes a plurality of hosts, and the plurality of hosts in the HPC cluster are connected via a network device, for example, connected via a device such as a router or a switch. When any one of the hosts sends data to another host, the host that sends the data is a transmit end, and the host that receives the data is a receive end. The receive end obtains a common transmission path network congestion identifier and/or a data receiving rate. The common transmission path network congestion identifier indicates that network congestion occurs on a common transmission path in a process of transmitting data from the transmit end to the receive end. Then, the receive end determines a network congestion scenario based on the common transmission path network congestion identifier and/or the data receiving rate, and sends a first acknowledgment message to the transmit end. The first acknowledgment message includes a network congestion scenario identifier. The network congestion scenario identifier is an identifier indicating the scenario in which network congestion occurs in the process of transmitting data from the transmit end to the receive end.

In this way, the receive end may notify the transmit end via the first acknowledgment message that the data is successfully received, and also notify the transmit end of the current network congestion scenario via the first acknowledgment message after determining the network congestion scenario, so that a network congestion problem is alleviated by adjusting a data sending rate when the transmit end learns of the network congestion scenario, thereby reducing impact of the network congestion on network transmission performance of the entire HPC cluster.

In a possible implementation, the network congestion scenario may be specifically receive end network congestion. In this case, the network congestion scenario identifier in the first acknowledgment message includes a congestion factor, and the congestion factor indicates a congestion degree of the network congestion that occurs at the receive end. For example, a larger value of the congestion factor indicates a larger congestion degree of the network congestion that occurs at the receive end, while a smaller value of the congestion factor indicates a smaller congestion degree of the network congestion that occurs at the receive end.

In this way, the receive end may indicate, based on a value of the congestion factor, the transmit end to make various adjustment for different degrees of receive end network congestion, so that the network transmission performance is not seriously affected by rapidly reducing the data sending rate. In addition, in actual application, small extra network bandwidth or even no extra network bandwidth is occupied by the receive end for feeding back the congestion factor. Compared with the case that the receive end directly feeds back a large amount of network congestion-related information to the transmit end, this can effectively reduce network link bandwidth occupied for network congestion alleviation, and improve link utilization.

In another possible implementation, the receive end obtains a first quantity and a second quantity. The first quantity is a quantity of first-type data flows received by the receive end, and the second quantity is a quantity of second-type data flows received by the receive end. In addition, a length of the first-type data flow is greater than a length of the second-type data flow. The receive end may generate the congestion factor based on the first quantity and the second quantity.

In another possible implementation, the length of the first-type data flow is greater than a length threshold, and the length of the second-type data flow is less than the length threshold.

In another possible implementation, when no network congestion occurs in the process of transmitting data from the transmit end to the receive end, the receive end generates a second acknowledgment message. The second acknowledgment message includes a smooth identifier, and the smooth identifier is an identifier indicating that no network congestion occurs in the process of transmitting data from the transmit end to the receive end. Therefore, the receive end may send the second acknowledgment message to the transmit end, to notify the transmit end that no network congestion currently occurs. In this way, when determining that no network congestion occurs, the transmit end may increase a network throughput by restoring the data sending rate, so as to avoid a decrease in the network throughput caused by untimely recovery of the data sending rate as much as possible.

According to a third aspect, this application further provides a network congestion handling apparatus. The network congestion handling apparatus includes modules configured to perform the network congestion handling method in any one of the first aspect or the possible implementations of the first aspect.

According to a fourth aspect, this application further provides a network congestion handling apparatus. The network congestion handling apparatus includes modules configured to perform the network congestion handling method in any one of the second aspect or the possible implementations of the second aspect.

According to a fifth aspect, this application further provides a device, including a processor and a memory. The memory is configured to store instructions, and when the device runs, the processor executes the instructions stored in the memory, so that the device performs the network congestion handling method in any one of the first aspect or the implementation methods of the first aspect, or so that the device performs the network congestion handling method in any one of the second aspect or the implementation methods of the second aspect.

It should be noted that the memory may be integrated in the processor, or may be independent of the processor. The device may further include a bus. The processor is connected to the memory through the bus. The memory may include a readable memory and a random access memory.

According to a sixth aspect, this application further provides a high-performance computing cluster. The cluster includes a plurality of hosts, and the plurality of hosts include a receive end and a transmit end. The transmit end is configured to perform functions of the operation steps of the method performed by the transmit end in any one of the first aspect or the possible implementations of the first aspect. The receive end is configured to perform functions of the operation steps of the method performed by the receive end in any one of the second aspect or the possible implementations of the second aspect.

According to a seventh aspect, this application provides a computer-readable storage medium. The computer-readable storage medium stores instructions, and when the instructions are run on a computer, the computer is enabled to perform the operation steps of the method according to any one of the first aspect and the implementations of the first aspect, or the computer is enabled to perform the method according to any one of the second aspect and the implementations of the second aspect.

According to an eighth aspect, this application provides a computer program product including instructions. When the computer program product runs on a computer, the computer is enabled to perform the operation steps of the method according to any one of the first aspect and the implementations of the first aspect, or the computer is enabled to perform the method according to any one of the second aspect and the implementations of the second aspect.

In this application, based on the implementations according to the foregoing aspects, the implementations may be further combined to provide more implementations.

DETAILED DESCRIPTION OF ILLUSTRATIVE EMBODIMENTS

The following describes technical solutions in this application with reference to accompanying drawings in embodiments of this application.

High-performance computing (HPC) is a high-performance computing architecture. Hundreds of hosts (for example, servers) constitute at least one HPC cluster through a network, and nodes in a same HPC cluster work concurrently with each other, thereby improving a processing speed and implementing high-performance computing. For ease of explanation, in the following embodiments of this application, an example in which the HPC computing architecture includes only one HPC cluster, and the HPC cluster includes three groups is used for description.

Figure 1:
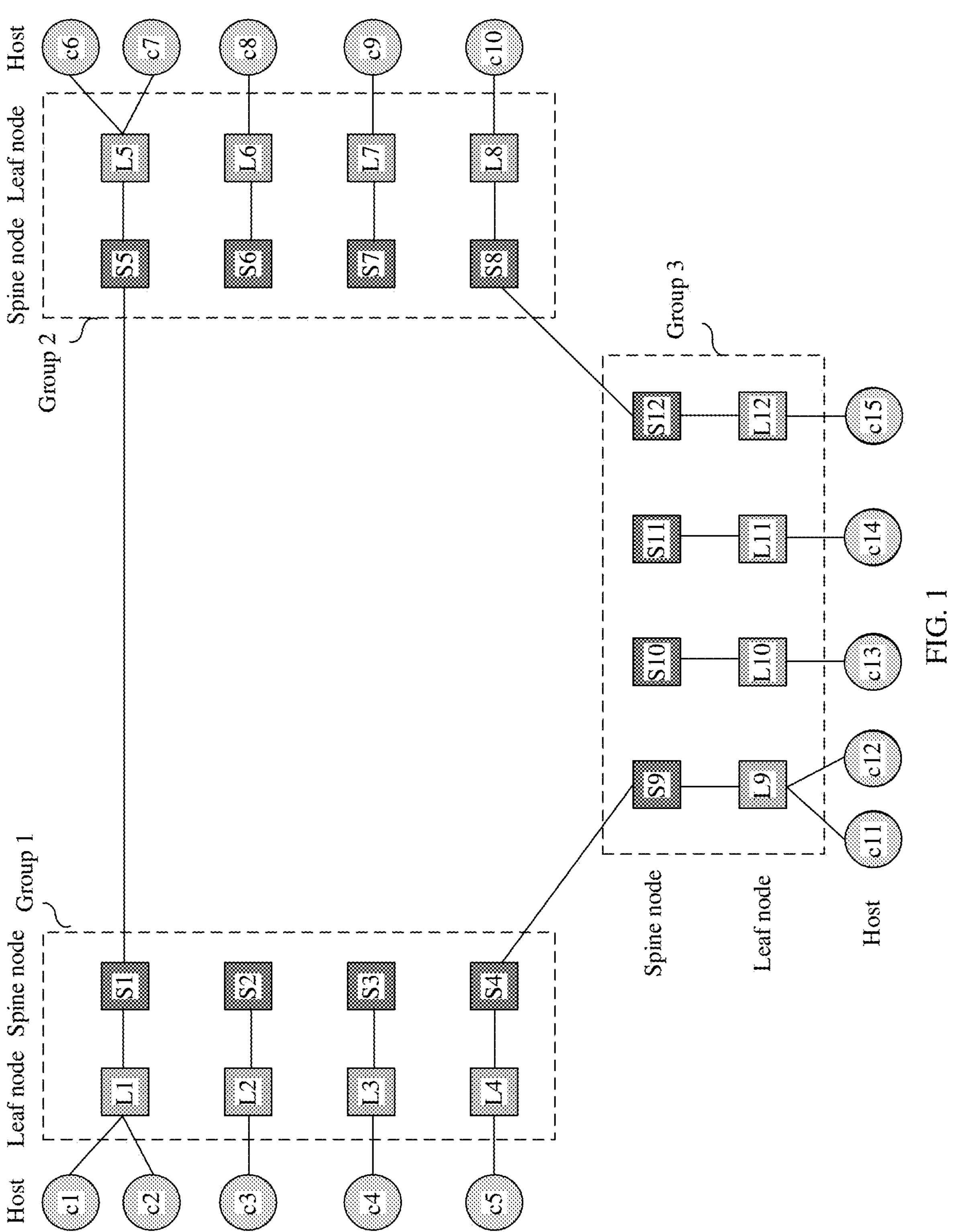
FIG. 1 is a schematic diagram of an HPC cluster network architecture according to an embodiment of this application.

FIG. 1 is a schematic diagram of a network architecture of an HPC cluster according to this application. As shown in the figure, the network architecture may be a Dragonfly+ topology network architecture, and the network architecture includes a plurality of groups. In FIG. 1, an example in which the network architecture includes a group 1, a group 2, and a group 3 is used for description. Each group includes spine nodes and leaf nodes. The spine node is configured to implement a communication connection between different groups, and the leaf node is configured to implement a communication connection between a host and a spine node in a same group. For example, a leaf node L1 is configured to implement a communication connection between a host C1 and a spine node Si. Data of the C1 may be transmitted in the group 1 and between the group 1 and another group via the L1 and the Si. The spine node may be a switching device such as a router or a switch, and the leaf node may be a switching device such as a switch or a router. In each group, the spine nodes are connected to the leaf nodes. One spine node may be connected to a plurality of leaf nodes, and one leaf node may also be connected to a plurality of spine nodes. The leaf nodes in each group may be connected to hosts in the group. Optionally, in some scenarios, some hosts in each group may be directly connected to the spine nodes, or the like.

It should be noted that quantities of spine nodes, leaf nodes, hosts, or groups in the network architecture shown in FIG. 1 do not constitute any limitation on this application, and may be set depending on a service requirement in a specific implementation process. In addition, in FIG. 1, an example in which different groups are interconnected through one link is used. To be specific, the group 1 and the group 2 are connected through only one communication link between the spine node Si and a spine node S5, the group 1 and the group 3 are connected through only one communication link between a spine node S4 and a spine node S9, and the group 2 and the group 3 are connected through only one communication link between a spine node 512 and a spine node S8.

Figure 2:
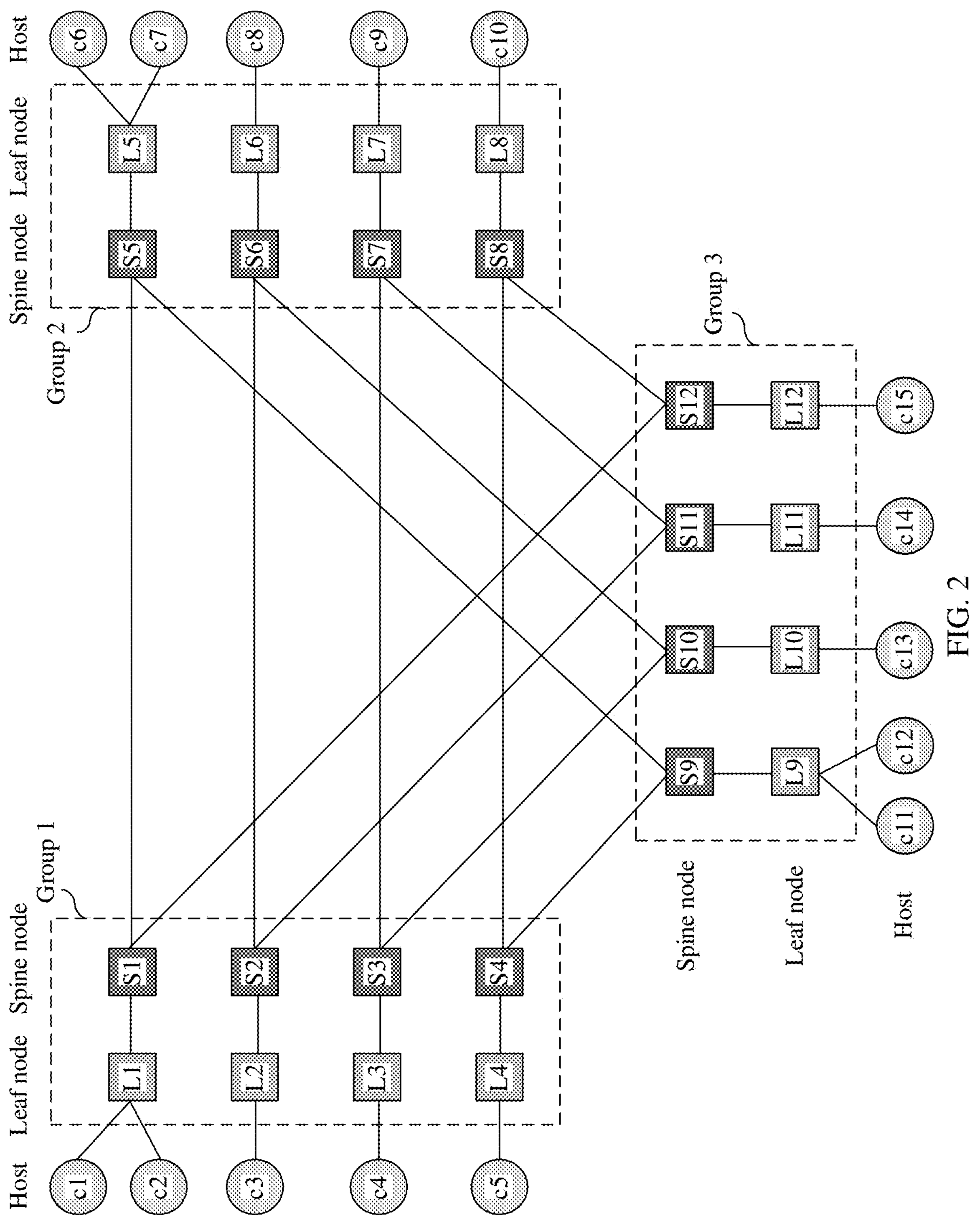
FIG. 2 is a schematic diagram of another HPC cluster network architecture according to an embodiment of this application.
Figure 3:
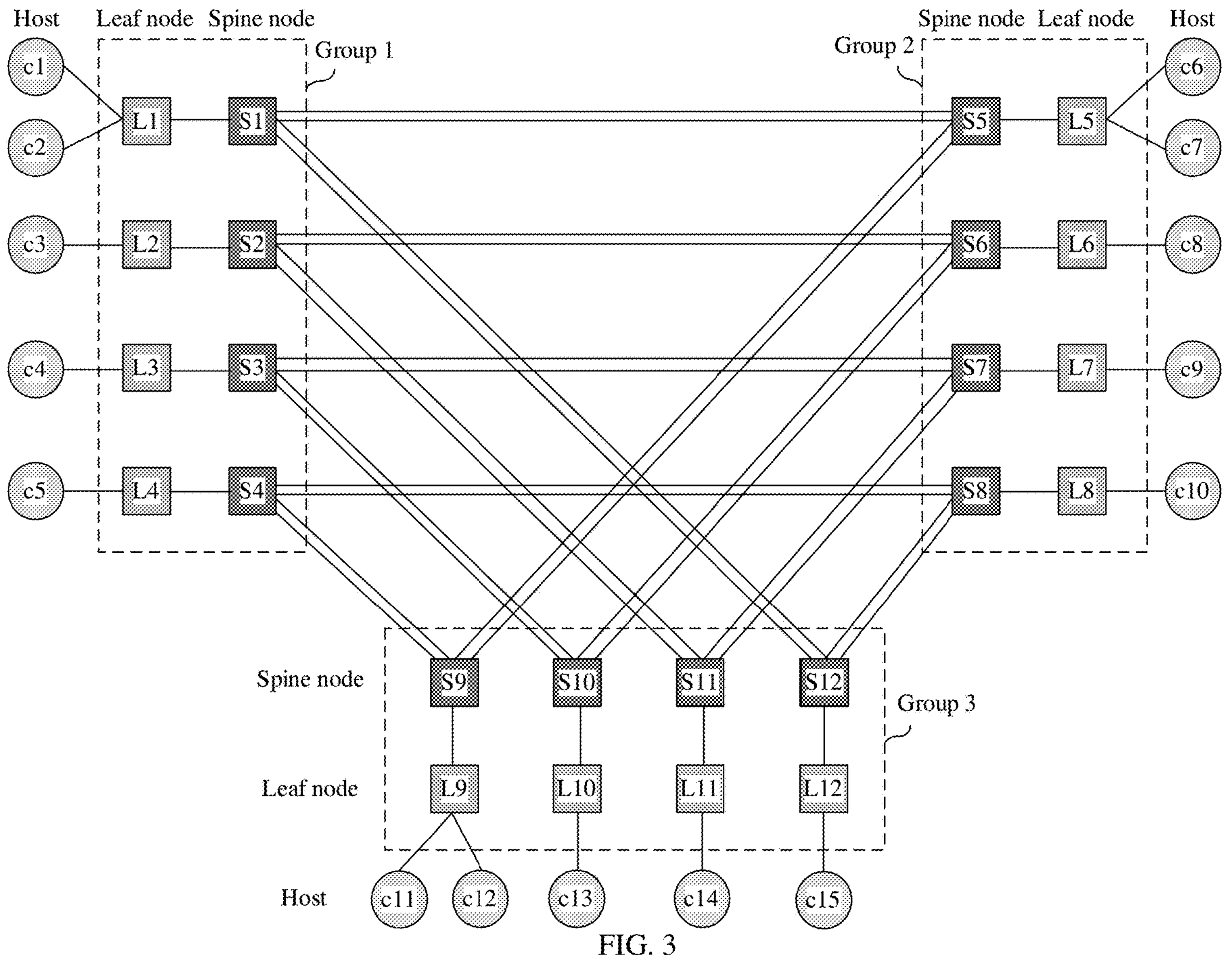
FIG. 3 is a schematic diagram of still another HPC cluster network architecture according to an embodiment of this application.

In a possible embodiment, the HPC cluster may further construct a network architecture in another form. For example, different groups in a same HPC cluster may be interconnected through a plurality of communication links. For example, FIG. 2 is a schematic diagram of another HPC cluster network architecture according to this application. As shown in the figure, all spine nodes in each group are connected to spine nodes in another group, and there is only one communication link between spine nodes in different groups. In another possible embodiment, FIG. 3 is a schematic diagram of another HPC cluster network architecture according to this application. As shown in the figure, all spine nodes in each group are connected to spine nodes in another group, and there may be a plurality of communication links between spine nodes in different groups. A difference between FIG. 3 and FIG. 2 lies in that there are two communication links between spine nodes in different groups in FIG. 3. For example, there are two communication links between an Si in a group 1 and an S5 in a group 2.

Based on any network architecture shown in FIG. 1 to FIG. 3, network congestion may occur. The network congestion usually refers to a phenomenon that a data packet is stacked at a receive end or on a transmission link between a transmit end and the receive end, and the data packet cannot be transmitted to the receive end in time. In this embodiment, the transmit end refers to a source end for sending the data packet, and the receive end refers to a destination end for receiving the data packet. A communication link used to transmit the data packet between the transmit end and the receive end may include one or more network devices, such as the leaf node and/or the spine node. The transmit end and the receive end are two different hosts in the network architecture. The two hosts may be in a same group or may be in different groups. For example, in the network architecture shown in FIG. 1, when the host C1 in FIG. 1 sends a data packet to a host C6, the host C1 is the transmit end, and the host C6 is the receive end. The data packet sent by the host C1 to the host C6 may be transmitted to the host C6 sequentially through the leaf node L1, the spine node Si, the spine node S5, and a leaf node L5.

The network congestion can be further classified, depending on scenarios in which the network congestion occurs, into common transmission path network congestion or receive end network congestion. A common transmission path is a transmission path for data transmission between the transmit end and the receive end in any network architecture shown in FIG. 1 to FIG. 3. When the receive end and the transmit end are in a same group, the common transmission path is a transmission path formed by network devices in the group through which data transmission between the receive end and the transmit end passes. When the receive end and the transmit end are separately in different groups, the common transmission path is a transmission path formed by a set of network devices that implement interconnection in the two groups and between the groups through which data transmission between the receive end and the transmit end passes. Cross-group transmission is used as an example. In the network architecture shown in FIG. 1, the host C1 may transmit the data packet to the host C6 through a transmission path that includes the leaf node L1, the spine node Si, the spine node S5, and the leaf node L5. In addition, a host C2 may also transmit a data packet to a host C7 through the transmission path. In this case, the transmission path that includes the leaf node L1, the spine node Si, the spine node S5, and the leaf node L5 is a common transmission path.

In actual application, a network transmission capability of the common transmission path is limited, and a large amount of data cannot be simultaneously transmitted on the common transmission path. Therefore, when a large amount of data needs to be transmitted on the common transmission path, network congestion of the data occurs on the common transmission path. This network congestion scenario is referred to as common transmission path network congestion hereinafter.

Alternatively, when a large amount of data is transmitted to a same receive end simultaneously, the receive end cannot process all data in time due to limitation of a rate at which a port of the receive end receives data, causing congestion of the data occurs at the receive end. Such a congestion scenario is referred to as receive end network congestion hereinafter.

In view of this, embodiments of this application provide a network congestion handling method. In a data transmission process, a receive end of data may determine a network congestion scenario in the occurrence of network congestion in a network, for example, determine that the network congestion is specifically common transmission path network congestion or receive end network congestion. In addition, the receive end notifies a transmit end of the network congestion scenario. In this way, the transmit end may adjust a data sending rate of the transmit end based on the network congestion scenario, to alleviate a network congestion problem, thereby reducing impact of the network congestion on network transmission performance of an entire HPC cluster. In addition, for different network congestion scenarios, the transmit end may adjust the data sending rate of the transmit end according to different policies, so that different network congestion problems can be targetedly alleviated, and handling effect of the network congestion can be optimized.

It should be noted that the network architectures shown in FIG. 1 to FIG. 3 are merely used as examples of the network architectures of the HPC cluster for description, and are not intended to limit a network architecture that can be used in technical solutions of this application to the foregoing examples. For example, in another possible network architecture to which the technical solutions of this application can be applied, for example, a Fattree network, in a topology structure of the Fattree network, spine nodes of different groups may alternatively communicate with each other via a switch at a core layer, or the like. For ease of description, in the following embodiments of this application, the network architecture shown in FIG. 1 is used as an example for description.

Figure 4:
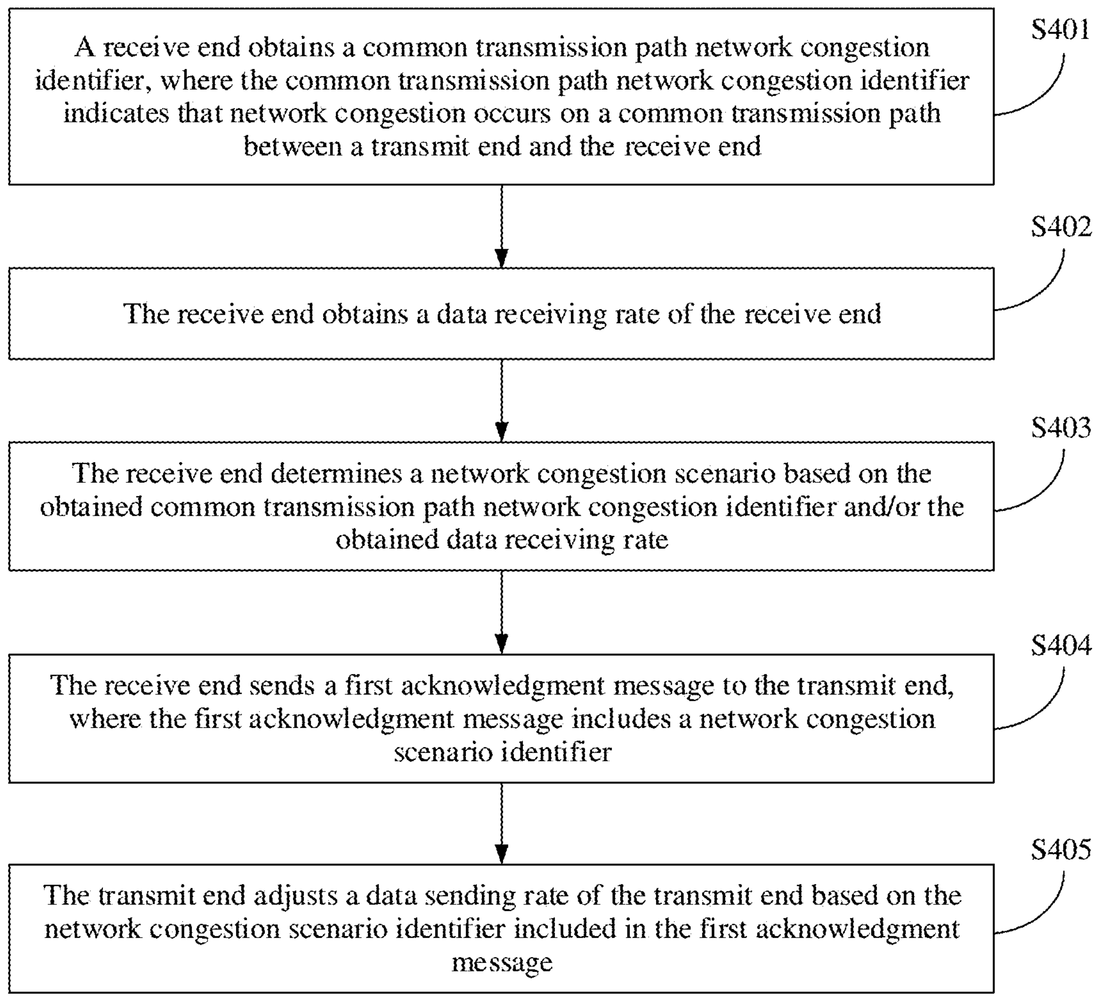
FIG. 4 is a schematic flowchart of a network congestion handling method according to an embodiment of this application.

The following further describes a network congestion handling method according to this application with reference to FIG. 4. FIG. 4 is a schematic flowchart of the network congestion handling method according to an embodiment of this application. An example in which a network congestion scenario in the network architecture shown in FIG. 1 is common transmission path network congestion and/or receive end congestion is used for description. The method includes the following steps.

S401: A receive end obtains a common transmission path network congestion identifier, where the common transmission path network congestion identifier indicates that network congestion occurs on a common transmission path between a transmit end and the receive end.

In specific implementation, in a process in which data is transmitted on the common transmission path, any network device on the common transmission path may forward, in a first in first out (FIFO) manner, a data packet that arrives at the network device. For example, a data packet that is put into a queue first is forwarded to the receive end first. One or more queues may be configured in each network device. Each queue is used to buffer a data packet to be forwarded to a next network device on the common transmission path. Data packets buffered in different queues are forwarded to different next network devices on the common transmission path. For any queue in a same network device, if the network device determines that a data volume to be forwarded in the queue is large, specifically, when a quantity of data packets to be forwarded in the queue is greater than or equal to a first threshold, the network device may determine that the data volume that needs to be transmitted on the common transmission path between the network device and a next network device corresponding to the queue is large, and the network device may determine that network congestion occurs on the common transmission path. In this case, the network device may add the common transmission path network congestion identifier to the data packets to be forwarded in the queue. For example, the network device may modify values of forward explicit congestion notification (FECN) flag bits of the data packets, for example, set the values of the flag bits from 0 to 1, so as to indicate, by using the FECN flag bits, that network congestion occurs on the common transmission path. When the quantity of data packets to be forwarded in the queue is less than a second threshold, the network device determines that no network congestion occurs on the common transmission path between the network device and the next network device corresponding to the queue, and does not need to add marks to the data packets in the queue, for example, retain default values (for example, 0) of the FECN flag bits of the data packets in the queue. In this embodiment, the second threshold is less than the first threshold. When the quantity of data packets to be forwarded in the queue is less than the first threshold and greater than the second threshold, the network device may mark the data packets in the queue according to a specific probability based on a data volume in the queue. A larger data volume in the queue indicates a higher probability that the network device adds the common transmission path network congestion identifier to the data packets in the queue.

Figure 5:
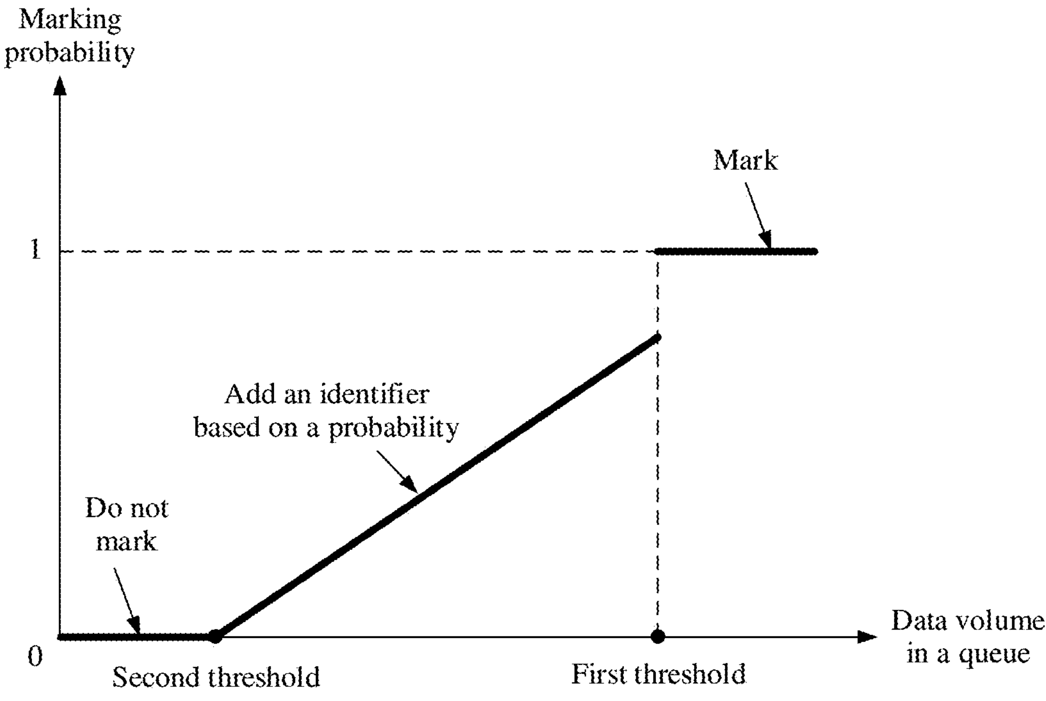
FIG. 5 is a schematic diagram of a correspondence between a queue depth and a marking probability according to an embodiment of this application.

In an example, a relationship between a probability that the network device marks a data packet in a queue and a queue length may be shown in FIG. 5. To be specific, for each queue, when a data volume in the queue is less than the second threshold, the network device does not mark the common transmission path network congestion identifier for each data packet in the queue, that is, a probability of adding the identifier is 0. When the data volume in the queue is greater than the first threshold, the network device adds the common transmission path network congestion identifier to each data packet in the queue, that is, the probability of adding the identifier is 1. When the data volume in the queue is between the first threshold and the second threshold, a relationship between a probability that the network device adds the common transmission path network congestion identifier to each data packet in the queue and the data volume in the queue is shown by an ascending curve in FIG. 5. Certainly, a correspondence between the data volume in the queue and the marking probability may alternatively be implemented in another manner. This is not limited in this embodiment.

Optionally, the first threshold may alternatively be equal to the second threshold (replaced by the first threshold hereinafter). In this case, when determining that a quantity of data packets to be forwarded in any queue is greater than the first threshold, a same network device modifies values of forward explicit congestion notification flag bits of the data packets. When determining that the quantity of the data packets to be forwarded in any queue is less than the first threshold, the same network device does not need to modify the values of the forward explicit congestion notification flag bits of the data packets.

In this way, after receiving the data, the receive end may obtain the common transmission path network congestion identifier by parsing the data.

S402: The receive end obtains a data receiving rate of the receive end.

In this embodiment, the receive end may further obtain the data receiving rate of the receive end. The data receiving rate may be calculated by the receive end by counting data volumes received by the receive end in a period (for example, a period of time). Specifically, the receive end may configure a timer and a counter, and a timing period of the timer is preset to T, in other words, timing is restarted at an interval of T. In each timing period, the receive end may count, by using the counter, a sum of data volumes of all data packets received by the receive end in the period, for example, a sum of volumes of all the data packets, which is referred to as a total data volume D hereinafter. Therefore, the receive end may obtain, by calculating a ratio (D/T) of the total data volume D to duration of the timing period T, an average rate at which the receive end receives the data in the timing period, and use the average rate as the data receiving rate of the receive end. In actual application, a throughput of the receive end may alternatively be used as the data receiving rate of the receive end.

It should be noted that, in this embodiment, an execution sequence of step S401 and step S402 is not limited. For example, in another example, step S401 and step S402 may be performed simultaneously, or step S402 may be performed before step S401 is performed.

S403: The receive end determines the network congestion scenario based on the obtained common transmission path network congestion identifier and/or the obtained data receiving rate.

When network congestion occurs in a network, network congestion may occur on the common transmission path between the transmit end and the receive end, or network congestion may occur at the receive end, that is, a plurality of different congestion scenarios exist. In this embodiment, in a process of receiving the data sent by the transmit end, the receive end may first determine whether a network congestion problem exists in a process of transmitting the data from the transmit end to the receive end, and determine a specific network congestion scenario when the network congestion exists.

In specific implementation, the receive end may determine, based on the common transmission path network congestion identifier, that network congestion occurs on the common transmission path. For example, the common transmission path network congestion identifier is specifically an FECN flag bit in a data packet. In addition, when a value of the FECN flag bit is 1, the receive end may determine that network congestion occurs on the common transmission path, and when the value of the FECN flag bit in the data packet is 0, the receive end may determine that no network congestion occurs on the common transmission path.

In addition, the receive end may further determine, based on the data receiving rate, whether network congestion occurs at the receive end. For example, the receive end may compare a current data receiving rate with a preset receiving rate threshold. If the data receiving rate of the receive end is greater than the receiving rate threshold, it indicates load generated when the receive end receives the data is large. In this case, it may be determined that network congestion already occurs at the receive end at a current moment. For example, the receiving rate threshold may be obtained through calculation according to the following formula (1):

$$V = \alpha * B \qquad \text{Formula (1)}$$

V is the receiving rate threshold, B is a maximum rate at which the receive end receives the data, and α is an adjustable weight value, for example, 0.75. In actual application, a value of a may be an empirical value less than 1, and the value of α may be different in different networks.

Based on the foregoing example, in this embodiment, the receive end determines the following four types of network congestion scenarios.

(1) If no network congestion occurs currently, the data receiving rate of the receive end is less than the receiving rate threshold, and the value of the FECN flag bit in the data packet received by the receive end is 0.

(2) If only the common transmission path network congestion occurs currently, the data receiving rate is less than the receiving rate threshold, and the value of the FECN flag bit is 1.

(3) If only the receive end network congestion occurs currently, the data receiving rate is greater than the receiving rate threshold, and the value of the FECN flag bit is 0.

(4) If the common transmission path network congestion and the receive end network congestion occur simultaneously, the data receiving rate is greater than the receiving rate threshold, and the value of the FECN flag bit is 1.

Further, the receive end usually feeds back a result acknowledgment of data receiving to the transmit end via an acknowledgment message, for example, an ACK (acknowledgment) message, to notify the transmit end that the data sent by the transmit end has been successfully received. In this embodiment, when the receive end determines, in the foregoing manner, that network congestion exists, the receive end may add a network congestion scenario identifier to a first acknowledgment message fed back to the transmit end, so that when the network congestion occurs, the receive end can notify the transmit end in time and enable the transmit end to take a corresponding measure to alleviate impact of the network congestion on network transmission performance of an entire HPC cluster.

Optionally, data carried in the first acknowledgment message may directly indicate a specific network congestion scenario. The following separately describes several possible implementations of the network congestion scenario identifier.

When the common transmission path network congestion occurs, the network congestion scenario identifier added by the receive end to the first acknowledgment message may be, for example, a value of a field that is included in the first acknowledgment message and that indicates a backward explicit congestion notification (BECN) flag bit. The value of the field may indicate whether the common transmission path network congestion occurs. For example, the value of the field of the BECN flag bit is 0 by default, and when the flag bit is set to 1, it indicates that the common transmission path network congestion occurs on the common transmission path. In this way, when the transmit end receives the first acknowledgment message, the transmit end may determine, based on the value of the common transmission path network congestion identifier, whether the common transmission path network congestion occurs.

When the receive end network congestion occurs, the network congestion scenario identifier added by the receive end to the first acknowledgment message may be, for example, a specific value of a reserved field in the first acknowledgment message to indicate whether the receive end network congestion occurs. For example, the value of the reserved field may be 0 by default, and when the reserved field is set to 1, it indicates that the receive end network congestion occurs. In this way, the transmit end may determine, based on the value of the reserved field included in the first acknowledgment message, whether the receive end network congestion occurs currently. Alternatively, the network congestion scenario identifier added by the receive end to the first acknowledgment message may be, for example, the data carried in the first acknowledgment message. The data may be specifically a congestion factor, and the congestion factor indicates a degree of congestion at the receive end. In some scenarios, a value of the congestion factor in the first acknowledgment message may also be defined by defining the value of the reserved field in the first acknowledgment message. For example, a larger value of the congestion factor may indicate a larger congestion degree of the receive end network congestion. On the contrary, a smaller value of the congestion factor may indicate a smaller congestion degree of the receive end network congestion.

In an example of calculating the congestion factor, when the receive end receives a data flow (including one or more data packets), the data flow may be classified into two types based on a length of the data flow. One is a first-type data flow (also be referred to as a "big flow" for short) whose length is greater than a preset length threshold. The other is a second-type data flow (also be referred to as a "small flow" for short) whose length is less than the length threshold. Each data flow may include one or more data packets. For a plurality of received data packets of a same data flow, the receive end may determine a length of the data flow based on a specific field carried in a header of a first data packet. For example, the specific field may be a DMALength field based on an InfiniBand (IB) protocol. In addition, a value of the field may indicate the length of the data flow. Then, the receive end determines, by comparing the length of the data flow with the length threshold, whether the data flow received by the receive end is a large flow or a small flow.

In addition, the receive end may further maintain a large flow table and a small flow table. The large flow table is used to record a data flow with a large length (for example, a data flow with a length greater than or equal to the length threshold) received by the receive end. The small flow table is used to record a data flow with a small length (for example, a data flow with a length less than the length threshold) received by the receive end. Data flows recorded in the large flow table and the small flow table may be further used to calculate the congestion factor.

For example, when recording data flow information by using the large flow table and the small flow table, the receive end may record the data flows in a form of a key-value pair. The key is a source address of the data flow, for example, an IP address of the transmit end. The value is a data volume of the data flow from the source address.

In an implementation, the receive end may count a plurality of data flows from a same source address as one data flow, to be specific, the value may be 1 by default. In this way, a large flow recorded in the large flow table may include a plurality of small flows. In this case, a quantity of data flows recorded in the large flow table is a quantity of all large flows currently received by the receive end, and may also be referred to as a length of the large flow table. Similarly, a quantity of data flows recorded in the small flow table may be referred to as a length of the small flow table.

When calculating the congestion factor, the receive end may first distinguish whether a received data flow is a large flow or a small flow, and may determine a source address of the data flow simultaneously. Then, the receive end may query, from a corresponding large flow table or a corresponding small flow table (determined based on a length of the data flow), whether a key-value pair corresponding to the source address exists. If the key-value pair corresponding to the source address does not exist, adding the key-value pair to the large flow table or the small flow table, where the key is the source address of the data flow, and the value is 1. If the key-value pair corresponding to the source address exists, the receive end may not need to change the large flow table or the small flow table. Correspondingly, when the data flow is received, the receive end may further delete an information record for the data flow from the large flow table or the small flow table, in other words, may delete the key-value pair that uses the source address of the data flow as the key from the table.

Then, the receive end may obtain a congestion factor K through calculation based on a length m of the large flow table and a length n of the small flow table. The length m of the large flow table indicates a quantity of data flows with large lengths, and the length n of the small flow table indicates a quantity of data flows with small lengths. For example, the congestion factor may be calculated according to the following formula (2):

$$K = a*m + b*n \qquad \text{Formula (2)}$$

a and b are weight values. In actual application, the large flow and the small flow have different impact on network congestion. Specifically, the large flow needs to transmit a large amount of data, and data transmission time is long, so that the large flow has large impact on network congestion. Correspondingly, the small flow needs to transmit a small amount of data, and data transmission time is short, so that the small flow has little impact on network congestion. Therefore, when values of a and b are set, the value of a may be greater than the value of b, for example, a is 0.6, and b is 0.4. Certainly, in another possible implementation, the values of a and b may alternatively be determined in another manner. For example, when the values of a and b are determined, lengths of data flows recorded in the large flow table and the small flow table may further be comprehensively considered. For example, when a difference between an average data length of a plurality of large flows and the length threshold is larger, a difference between a and b may also be larger, for example, a is 0.8, b is 0.2.

Certainly, a specific implementation process of calculating the congestion factor is merely used as an example for description, and is not intended to limit the specific implementation to the example. For example, in another possible example, the receive end may count the plurality of data flows from the same source address as plurality of data flows. In other words, the value is specifically a quantity of the plurality of data flows. Therefore, the length m of the large flow table participating in calculation in the foregoing formula (2) is a sum of values in all key-value pairs in the large flow table. In this case, a value of m is greater than or equal to a total quantity of key-value pairs in the large flow table. Similarly, the length n of the small flow table is a sum of values in all key-value pairs in the small flow table.

In this embodiment, when no network congestion occurs at the receive end, the value of the congestion factor may be directly set to 0, and when network congestion occurs at the receive end, the value of the congestion factor may be calculated using the foregoing process. In this way, the congestion factor added by the receive end to the first acknowledgment message may be used to identify whether network congestion occurs at the receive end. Specifically, when the value of the congestion factor K is 0, it indicates that no network congestion occurs at the receive end. When the value of the congestion factor K is not 0, it indicates that network congestion occurs at the receive end, and a larger value of K indicates severer of network congestion that occurs at the receive end.

S404: The receive end sends the first acknowledgment message to the transmit end, where the first acknowledgment message includes the network congestion scenario identifier.

S405: The transmit end adjusts a data sending rate of the transmit end based on the network congestion scenario identifier included in the first acknowledgment message.

When determining, based on the first acknowledgment message, whether the data successfully arrives at the receive end, the transmit end may further determine, based on the network congestion scenario identifier carried in the first acknowledgment message, whether network congestion occurs in the process of transmitting the data from the transmit end to the receive end, and the specific network congestion scenario when the network congestion occurs. For example, when the transmit end parses from the first acknowledgment message that the value of the congestion factor K is not zero, the transmit end may determine that network congestion occurs when the data is transmitted at the receive end, and when parsing from the first acknowledgment message that the value of the BECN flag bit is 1, the transmit end may determine that network congestion occurs when the data is transmitted on the common transmission path. Certainly, if the value of K is 0 and the value of the BECN flag bit is also 0, the transmit end may determine that no network congestion occurs in the data transmission process.

In a possible embodiment, in addition to being generated by the receive end and sent to the transmit end, the first acknowledgment message may alternatively come from a network device between the transmit end and the receive end. For example, when the network device forwards a data packet between the transmit end and the receive end, if it is determined that network congestion occurs on the common transmission path currently, the network device may generate a first acknowledgment message that includes a common transmission path network congestion identifier, and send the first acknowledgment message to the transmit end, so that the transmit end determines, based on the common transmission path network congestion identifier in the first acknowledgment message, that the common transmission path network congestion occurs currently on the common transmission path. The network device may be, for example, a device such as a switch or a router.

It should be noted that, in this embodiment, the transmit end executes different processing policies for different network congestion scenarios. To be specific, there is a difference between adjustment to the data sending rate of the transmit end in the scenario of receive end network congestion and adjustment to the data sending rate of the transmit end in the scenario of the common transmission path network congestion. For example, when determining that the receive end network congestion exists, the transmit end may reduce the data sending rate of the transmit end based on the value of the congestion factor, and when determining that the common transmission path network congestion exists, the transmit end may reduce the data sending rate of the transmit end to a preset rate or the like. The following separately describes, by using examples, policies for adjusting the data sending rate that are performed by the transmit end in the two different scenarios: the receive end network congestion and the common transmission path network congestion.

When adjusting the data sending rate for the receive end network congestion, the transmit end may parse out the congestion factor from the first acknowledgment message, and determine, based on a non-zero value of the congestion factor, that the receive end congestion exists. Then, the transmit end may reduce the data sending rate of the transmit end based on the value of the congestion factor. For example, when no network congestion occurs, a data sending rate of the transmit end is V1, and when the receive end network congestion occurs, the transmit end may reduce the data sending rate from V1 to V2, where V2=V1/K, in other words, the data sending rate is reduced to 1/K of a normal data sending rate. Alternatively, the data sending rate of the transmit end and the value of the congestion factor satisfy another possible inverse proportional relationship, to be specific, a larger congestion factor indicates a smaller data sending rate of the transmit end. In this way, when the transmit end subsequently sends the data, because the data sending rate is reduced, pressure on the receive end to receive the data may be reduced when the data is transmitted to the receive end, in other words, the data receiving rate of the receive end may be reduced, thereby effectively alleviating the receive end network congestion problem.

Further, the transmit end may further reduce the data sending rate of the transmit end based on the congestion factor and the length of the data flow. Specifically, when a data packet currently sent by the transmit end belongs to a data flow with a large length (namely, a large flow), the transmit end may reduce the data sending rate to 1/K of the normal data sending rate. However, when the data packet currently sent by the transmit end belongs to a data flow with a small length (namely, a small flow), because transmission time required by the small flow is short, and the small flow is generally delay-sensitive, the transmit end may not reduce the data sending rate of the transmit end. Alternatively, reduction of the data sending rate performed by the transmit end for the small flow is slighter than that of the data sending rate performed by the transmit end for the large flow. For example, the transmit end reduces the data sending rate to 1/K of the normal data sending rate for the large flow, and the transmit end reduces the data sending rate to 2/K (K is greater than 2) of the normal data sending rate for the small flow.

Certainly, the foregoing example is merely used to illustrate specific implementation of reducing the data sending rate of the transmit end when the receive end network congestion exists. In actual application, the data sending rate of the transmit end may alternatively be reduced in another manner. This is not limited in this embodiment.

It should be noted that, because the congestion factor represents a degree of the receive end network congestion, the transmit end may make, based on the congestion factor, different reduction for the rate depending on degrees of receive end network congestion. For example, when the receive end network congestion is minor (the value of K is small), the transmit end slightly reduces the data sending rate, so that a network throughput does not become excessively low after the transmit end reduces the data sending rate. When the receive end network congestion is serious (the value of K is large), the transmit end significantly reduces the data sending rate, so that the network transmission performance is not seriously affected through significant reduction in the data sending rate. In addition, small extra network bandwidth or even no extra network bandwidth (for example, in the case that the congestion factor is defined by reusing an existing or reserved field in the ACK message) is occupied by the receive end for feeding back the congestion factor. Compared with the case that the receive end directly feeds back a large amount of network congestion-related information to the transmit end, this can effectively reduce network link bandwidth occupied for network congestion alleviation, and improve link utilization.

When adjusting the data sending rate for the common transmission path network congestion, the transmit end determines, based on the common transmission path network congestion identifier (for example, the BECN flag bit) obtained by parsing the first acknowledgment message, that the common transmission path network congestion currently occurs. In addition, the data sending rate of the transmit end may be reduced according to a preset rule, for example, the data sending rate is reduced to ½ of the data sending rate before adjustment by default, or the data sending rate is reduced to a specified rate.

Further, the transmit end may further adjust the data sending rate of the transmit end based on a priority of the data flow. For example, after determining that the common transmission path network congestion currently exists, the transmit end may determine a priority of a to-be-sent data flow, and determine reduction of the data sending rate based on the priority of the data flow. For example, the transmit end may calculate a reduced data sending rate according to the following formula (3):

$$C_2 = C_1 * f(sl) \quad \text{Formula (3)}$$

$C_1$ is a data sending rate before adjustment, $C_2$ is a data sending rate after adjustment, sl is a priority of a data flow, and f (sl) is a rate reduction factor corresponding to the data flow. The priority of the data flow may be, for example, a service level corresponding to the data flow. A lower priority of the data flow indicates a smaller value of the rate reduction factor f (sl), and accordingly a more significant reduction of the data sending rate, while a higher priority of the data flow indicates a larger value of the rate reduction factor f (sl), and accordingly a less significant reduction of the data sending rate. In actual application, the data sending rate of the transmit end may alternatively be adjusted in another manner. For example, when the priority of the data flow satisfies a specific condition, the transmit end may not reduce the data sending rate of the transmit end. This is not limited in this embodiment.

To further alleviate the common transmission path network congestion problem, when the transmit end adjusts the data sending rate, some devices in the network may further adjust the common transmission path used to transmit communication data between the transmit end and the receive end. For example, the data sent by the transmit end may be transmitted to the receive end according to an adaptive routing policy through another common transmission path on which no network congestion occurs, so as to reduce traffic on the common transmission path on which network congestion currently occurs, and further alleviate the common transmission path network congestion problem. For example, when a network device on the common transmission path determines that network congestion occurs on the common transmission path, the network device may determine quantities of data packets to be forwarded on other common transmission paths on which the network device is located, and further determine another common transmission path on which a quantity of data packets to be forwarded is the smallest. In this way, the network device may transmit, over the determined another common transmission path, a data packet that originally needs to be transmitted on the common transmission path on which network congestion has occurred.

When the transmit end determines that both the receive end network congestion and the common transmission path network congestion currently exist, because the network congestion is serious, the transmit end may reduce the data sending rate to a specified data sending rate, for example, a lower limit of the data sending rate of the transmit end. Alternatively, the transmit end may stop sending the data until the network congestion is alleviated or resolved, and then the transmit end continues to send the data and increases the data sending rate.

It should be noted that, in this embodiment, an example in which the receive end simultaneously determines whether network congestion occurs on the common transmission path and whether network congestion occurs at the receive end is used for description. In actual application, the receive end may alternatively determine whether network congestion occurs on only the common transmission path, or the receive end may determine whether network congestion occurs only at the receive end. Therefore, in another possible embodiment, only step S401 and step S403 to step S405 in this embodiment may be performed, or only step S402 to step S405 in this embodiment may be performed.

In this embodiment, the transmit end executes different processing policies for different network congestion scenarios, so that a problem of network transmission performance deterioration caused by network congestion can be targetedly alleviated, thereby improving stability of the network transmission performance. In addition, when detecting that network congestion exists, the receive end may trigger, by feeding back an acknowledgment message, the transmit end to effectively regulate and control the data sending rate, so that not only the network congestion problem can be effectively resolved, but also the network congestion problem can be resolved within one round trip time (RTT) after the network congestion occurs. This makes network congestion control more timely.

Further, if the transmit end reduces the data sending rate and resolves the network congestion problem, after receiving the data sent by the transmit end, the receive end may determine whether network congestion still exists. When determining that no network congestion occurs, if the data receiving rate of the receive end is less than the foregoing receiving rate threshold, and the value of the FECN flag bit in the data packet is 0, the receive end may generate a second acknowledgment message including a smooth identifier, and feed back the second acknowledgment message to the transmit end. In this way, the transmit end may not only determine, based on the second acknowledgment message, that the data has been successfully received by the receive end, but also determine, based on the smooth identifier carried in the second acknowledgment message, that no network congestion occurs in the data transmission process. In this case, the transmit end may increase the data sending rate of the transmit end, so that the transmit end can quickly restore to a normal rate to transmit a data flow, thereby improving the network throughput. Within one RTT after the network congestion problem is resolved, the transmit end can increase the network throughput by restoring the data sending rate. In this way, a decrease in the network throughput caused by untimely recovery of the data sending rate can be avoided as much as possible. Specific implementation of the smooth identifier carried in the second acknowledgment message is similar to specific implementation of carrying the network congestion scenario identifier in the first acknowledgment message. For example, a value of a specific field in the second acknowledgment message may be defined to indicate that no network congestion occurs in the process of transmitting data from the transmit end to the receive end. For a specific process, refer to the foregoing related descriptions, and details are not described herein again.

It should be noted that another appropriate step combination that can be figured out by a person skilled in the art based on the content described above also falls within the protection scope of this application. In addition, a person skilled in the art should also appreciate that all embodiments described in this specification are examples, and the related actions are not necessarily mandatory to this application.

The foregoing describes in detail the network congestion handling method provided in this application with reference to FIG. 1 to FIG. 5. The following describes, with reference to FIG. 6 to FIG. 8, network congestion handling apparatuses and a computing device provided in this application.

Figure 6:
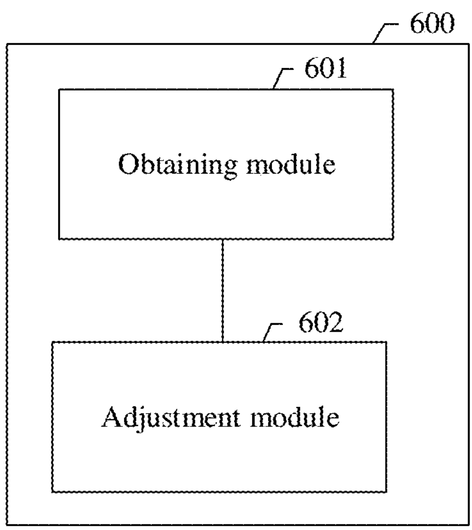
FIG. 6 is a schematic diagram of a structure of a network congestion handling apparatus according to an embodiment of this application.

FIG. 6 is a schematic diagram of a structure of a network congestion handling apparatus according to this application. An apparatus 600 is used in a transmit end in a high-performance computing HPC cluster. The cluster includes a plurality of hosts, and the plurality of hosts are connected via a network device. The apparatus 600 may include:

an obtaining module 601, configured to obtain a first acknowledgment message, where the first acknowledgment message includes a network congestion scenario identifier, the network congestion scenario identifier is an identifier indicating a scenario in which network congestion occurs in a process in which the transmit end transmits data to a receive end, and the transmit end and the receive end are any two hosts in the plurality of hosts; and an adjustment module 602, configured to adjust a data sending rate of the transmit end based on the network congestion scenario identifier.

It should be understood that the apparatus 600 in this embodiment of this application may be implemented by using a central processing unit (CPU), may be implemented by using an application-specific integrated circuit (ASIC), or may be implemented by using a programmable logic device (PLD). The PLD may be a complex programmable logic device (CPLD), a field-programmable gate array (FPGA), a generic array logic (GAL), or any combination thereof. Alternatively, when the data processing method shown in FIG. 4 may be implemented by using software, the apparatus 600 and each module of the apparatus 600 may be software modules.

Optionally, the network congestion scenario identifier indicates that network congestion occurs at the receive end, the network congestion scenario identifier includes a congestion factor, and the congestion factor indicates a congestion degree of the network congestion that occurs at the receive end.

Optionally, a data flow transmitted by the transmit end to the receive end includes a first-type data flow and a second-type data flow, and a length of the first-type data flow is greater than a length of the second-type data flow.

The adjustment module 602 is specifically configured to reduce, based on the congestion factor, a data sending rate at which the transmit end sends the first-type data flow.

Optionally, the network congestion scenario is common transmission path network congestion, and the adjustment module 602 is specifically configured to obtain a priority of a to-be-sent data flow; and configured to reduce, based on the priority of the to-be-sent data flow, a rate at which the transmit end sends the data flow.

Optionally, the to-be-sent data flow includes a first data flow and a second data flow, a priority of the first data flow is higher than a priority of the second data flow, and a rate at which the transmit end sends the first data flow is higher than a rate at which the transmit end sends the second data flow.

Optionally, after the transmit end adjusts the data sending rate of the transmit end based on the congestion scenario identifier, the obtaining module 601 is further configured to obtain a second acknowledgment message. The second acknowledgment message includes a smooth identifier, and the smooth identifier is an identifier indicating that no network congestion occurs in the process of transmitting data from the transmit end to the receive end.

The adjustment module 602 is further configured to increase the data sending rate of the transmit end based on the smooth identifier.

The apparatus 600 may determine the network congestion scenario based on the network congestion scenario identifier, and adjust the data sending rate of the transmit end to alleviate a network congestion problem, thereby reducing impact of network congestion on network transmission performance of the entire HPC cluster. In addition, for different network congestion scenarios, the apparatus 600 may adjust the data sending rate of the transmit end according to different policies, so that different network congestion problems can be targetedly alleviated, and handling effect of the network congestion can be optimized.

The network congestion handling apparatus 600 according to this embodiment of this application may correspondingly perform operation steps of the method described in embodiments of this application that are performed by the transmit end. In addition, the foregoing and other operations and/or functions of the modules of the network congestion handling apparatus 600 are separately used to implement corresponding procedures of the method in FIG. 4. For brevity, details are not described herein again.

Figure 7:
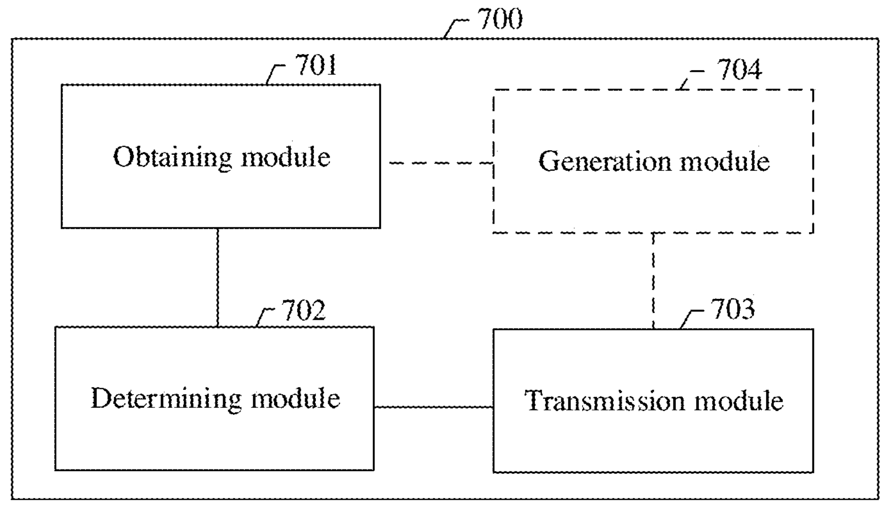
FIG. 7 is a schematic diagram of a structure of another network congestion handling apparatus according to an embodiment of this application.

FIG. 7 is a schematic diagram of a structure of a network congestion handling apparatus according to this application. An apparatus 700 is used in a receive end in a high-performance computing HPC cluster. The cluster includes a plurality of hosts, and the plurality of hosts are connected via a network device. The apparatus 700 may include:

- an obtaining module 701, configured to obtain a common transmission path network congestion identifier and/or a data receiving rate, where the common transmission path network congestion identifier indicates that network congestion occurs on a common transmission path in a process of transmitting data from a transmit end to the receive end, and the transmit end and the receive end are any two hosts in the plurality of hosts;
- a determining module 702, configured to determine a network congestion scenario based on the common transmission path network congestion identifier and/or the data receiving rate; and
- a transmission module 703, configured to send a first acknowledgment message to the transmit end, where the first acknowledgment message includes a network congestion scenario identifier, and the network congestion scenario identifier is an identifier indicating the scenario in which network congestion occurs in the process of transmitting data from the transmit end to the receive end.

It should be understood that the apparatus 700 in this embodiment of this application may be implemented by using a central processing unit (CPU), may be implemented by using an application-specific integrated circuit (ASIC), or may be implemented by using a programmable logic device (PLD). The PLD may be a complex programmable logic device (CPLD), a field-programmable gate array (FPGA), a generic array logic (GAL), or any combination thereof. Alternatively, when the data processing method shown in FIG. 4 may be implemented by using software, the apparatus 700 and each module of the apparatus 700 may be software modules.

Optionally, the network congestion scenario is receive end network congestion, the network congestion scenario identifier includes a congestion factor, and the congestion factor indicates a congestion degree of the network congestion that occurs at the receive end.

Optionally, the obtaining module 701 is further configured to obtain a first quantity and a second quantity. The first quantity is a quantity of first-type data flows received by the receive end, and the second quantity is a quantity of second-type data flows received by the receive end. A length of the first-type data flow is greater than a length of the second-type data flow.

The apparatus 700 further includes a generation module 704, configured to generate the congestion factor based on the first quantity and the second quantity.

Optionally, the length of the first-type data flow is greater than a length threshold, and the length of the second-type data flow is less than the length threshold.

Optionally, the apparatus further includes the generation module 704, configured to: when no network congestion occurs in the process of transmitting data from the transmit end to the receive end, generate, for the receive end, a second acknowledgment message. The second acknowledgment message includes a smooth identifier, and the smooth identifier is an identifier indicating that no network congestion occurs in the process of transmitting data from the transmit end to the receive end.

The transmission module 703 is further configured to send the second acknowledgment message to the transmit end.

The apparatus 700 may feed back the network congestion scenario to the transmit end, so that the transmit end can alleviate a network congestion problem by adjusting a data sending rate of the transmit end under an indication of the apparatus 700, thereby reducing impact of the network congestion on network transmission performance of the entire HPC cluster.

The network congestion handling apparatus 700 according to this embodiment of this application may correspondingly perform the method described in embodiments of this application, and the foregoing and other operations and/or functions of the modules of the network congestion handling apparatus 700 are separately used to implement corresponding procedures of the method in FIG. 4. For brevity, details are not described herein again.

Figure 8:
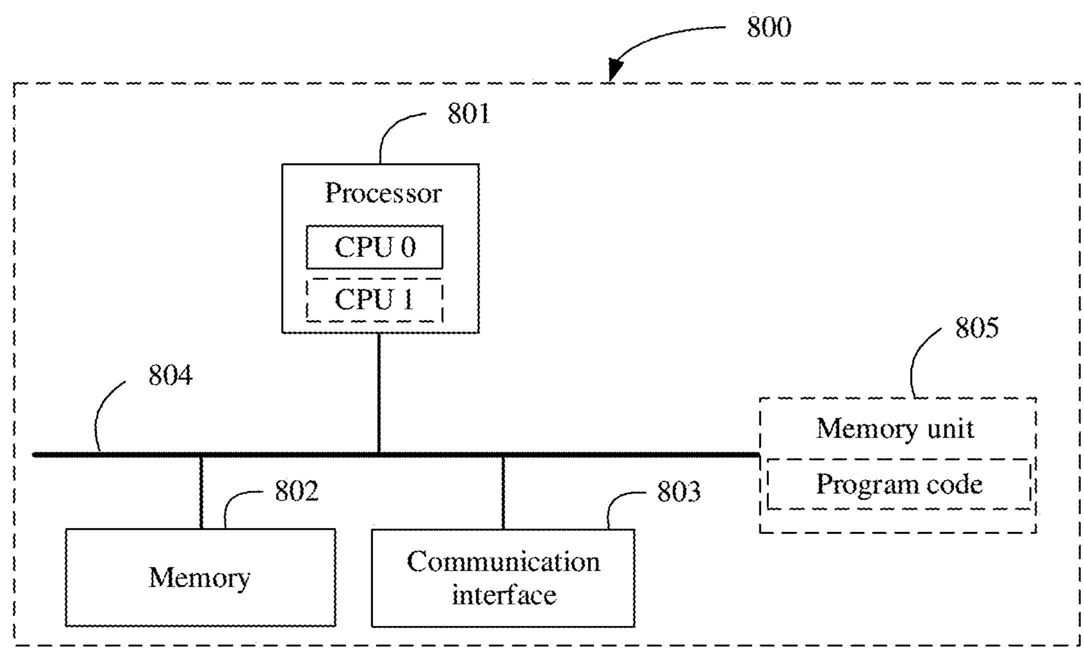
FIG. 8 is a schematic diagram of a hardware structure of a device according to an embodiment of this application.

FIG. 8 is a schematic diagram of a device 800 according to this application. As shown in the figure, the device 800 includes a processor 801, a memory 802, and a communication interface 803. The processor 801, the memory 802, and the communication interface 803 communicate with each other through a bus 804, or may implement communication by using another means such as wireless transmission. The memory 802 is configured to store instructions, and the processor 801 is configured to execute the instructions stored in the memory 802. Further, the device 800 may further include a memory unit 805, and the memory unit 805 may be connected to the processor 801, the memory 802, and the communication interface 803 through the bus 804. The memory 802 stores program code, and the processor 801 may invoke the program code stored in the memory 802 to perform the following operations:

obtaining a first acknowledgment message, where the first acknowledgment message includes a network congestion scenario identifier, the network congestion scenario identifier is an identifier indicating a scenario in which network congestion occurs in a process of transmitting data from a transmit end to a receive end, and the transmit end and the receive end are any two hosts in a plurality of hosts; and adjusting a data sending rate of the transmit end based on the network congestion scenario identifier, where the device 800 may be implemented by hardware of the transmit end.

It should be understood that, in this embodiment of this application, the processor 801 may be a CPU, and the processor 801 may alternatively be another general-purpose processor, a digital signal processor (DSP), an application-specific integrated circuit (ASIC), a field-programmable gate array (FPGA) or another programmable logic device, a discrete gate or transistor logic device, a discrete device component, or the like. The general-purpose processor may be a microprocessor or any conventional processor.

The memory 802 may include a read-only memory and a random access memory, and provide instructions and data to the processor 801. The memory 802 may further include a nonvolatile random access memory. For example, the memory 802 may further store information of a device type.

The memory 802 may be a volatile memory or a nonvolatile memory, or may include both the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example, and not limitation, RAMs of many forms are applicable, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The communication interface 803 is configured to communicate with another device connected to the device 800. In addition to a data bus, the bus 804 may further include a power bus, a control bus, a status signal bus, and the like. However, for clear description, various types of buses in the figure are marked as the bus 804.

It should be understood that the device 800 according to this embodiment of this application may be corresponding to the apparatus 600 in embodiments of this application, and may correspondingly perform functions performed by the receive end in the method shown in FIG. 4 in embodiments of this application. In addition, the foregoing and other operations and/or functions implemented by the device 800 are separately used to implement corresponding procedures of the method in FIG. 4. For brevity, details are not described herein again.

This application further provides a device. A structure of the device is similar to that of the device shown in FIG. 8, and includes a processor, a memory, and a communication interface. The processor, the memory, and the communication interface communicate with each other through a bus, or may implement communication by using another means such as wireless transmission. The memory is configured to store instructions, and the processor is configured to execute the instructions stored in the memory. Further, the device may further include a memory unit, and the memory unit may be connected to the processor, the memory, and the communication interface through the bus. The memory stores program code, and the processor may invoke the program code stored in the memory to perform the following operations:

obtaining a common transmission path network congestion identifier and/or a data receiving rate, where the common transmission path network congestion identifier indicates that network congestion occurs on a common transmission path in a process of transmitting data from a transmit end to a receive end, and the transmit end and the receive end are any two hosts in a plurality of hosts;

determining a network congestion scenario based on the common transmission path network congestion identifier and/or the data receiving rate; and sending a first acknowledgment message to the transmit end, where the first acknowledgment message includes a network congestion scenario identifier, and the network congestion scenario identifier is an identifier indicating the scenario in which the network congestion occurs in the process of transmitting data from the transmit end to the receive end. The device is implemented by hardware of the receive end.

It should be understood that, in this embodiment of this application, the processor may be a CPU, and the processor may alternatively be another general-purpose processor, a digital signal processor (DSP), an application-specific integrated circuit (ASIC), a field-programmable gate array (FPGA) or another programmable logic device, a discrete gate or transistor logic device, a discrete device component, or the like. The general-purpose processor may be a microprocessor or any conventional processor.

The memory may include a read-only memory and a random access memory, and provide instructions and data to the processor. The memory may further include a nonvolatile random access memory. For example, the memory may further store information of a device type.

The memory may be a volatile memory or a nonvolatile memory, or may include both the volatile memory and the nonvolatile memory. The nonvolatile memory may be a read-only memory ROM, a PROM, an EPROM, an EEPROM, or a flash memory. The volatile memory may be a RAM, and is used as an external cache. By way of example, and not limitation, RAMs of many forms are applicable, such as an SRAM, a DRAM, an SDRAM, a DDR SDRAM, an ESDRAM, an SLDRAM, and a DR RAM.

The communication interface is configured to communicate with another device connected to the device. In addition to a data bus, the bus may further include a power bus, a control bus, a status signal bus, and the like. However, for clear description, various types of buses in the figure are marked as the bus.

It should be understood that the device according to this embodiment of this application may be corresponding to the apparatus 700 in embodiments of this application, and may correspondingly perform operation steps performed by the receive end in the method shown in FIG. 4 in embodiments of this application. In addition, the foregoing and other operations and/or functions implemented by the device are separately used to implement corresponding procedures of the method in FIG. 4. For brevity, details are not described herein again.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the processes or the functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to a high-performance computing (HPC) cluster, the HPC cluster comprising a plurality of hosts, the plurality of hosts being connected via at least one network device, and the method comprising:

obtaining, by a transmit end, a first acknowledgment message, wherein the first acknowledgment message comprises a network congestion scenario identifier, the network congestion scenario identifier indicates a scenario in which network congestion is occurring in a process in which the transmit end transmits data to a receive end, and the transmit end and the receive end are comprised in the plurality of hosts; and adjusting, by the transmit end, a data sending rate of the transmit end based on the network congestion scenario identifier; and wherein the network congestion scenario identifier indicates that network congestion occurs at the receive end, a data flow transmitted by the transmit end to the receive end comprises at least one first-type data flow and at least one second-type data flow, the network congestion scenario identifier comprises a congestion factor, the congestion factor is calculated based on the at least one first-type data flow having a first weight, the at least one second-type data flow having a second weight, a length of a first flow table for the at least one first-type data flow, and a length of a second flow table for the at least one second-type data flow, and wherein the first-type data flow and the second-type data flow have different lengths; and wherein the congestion factor is equal to a sum of the length of the first flow table multiplied by the first weight and the length of the second flow table multiplied by the second weight, the length of the first flow table is a quantity of data flows recorded in the first flow table, and the length of the second flow table is a quantity of data flows recorded in the second flow table; and wherein the first flow table records a plurality of flows having a length larger than a threshold, the second flow table records a plurality of flows having a length smaller than the threshold, and the first weight is determined based on a difference between the threshold and an average length of the plurality of flows having the length larger than the threshold.

2. The method according to claim 1, wherein adjusting, by the transmit end, the data sending rate of the transmit end based on the network congestion scenario identifier comprises:

adjusting, by the transmit end based on the congestion factor, a data sending rate at which the transmit end sends the at least one first-type data flow.

3. The method according to claim 1, wherein the scenario comprises common transmission path network congestion, and adjusting, by the transmit end, the data sending rate of the transmit end based on the network congestion scenario identifier comprises:

obtaining, by the transmit end, a priority of a to-be-sent data flow; and adjusting, by the transmit end based on the priority of the to-be-sent data flow, a rate at which the transmit end sends the data flow.

4. The method according to claim 3, wherein a priority of the at least one first-type data flow is higher than a priority of the at least one second-type data flow, and a rate at which the transmit end sends the at least one first-type data flow is higher than a rate at which the transmit end sends the at least one second-type data flow.

5. The method according to claim 1, wherein the first weight is larger than the second weight.

6. A method, applied to a high-performance computing (HPC) cluster, the cluster comprising a plurality of hosts, the plurality of hosts being connected via at least one network device, and the method comprising:

obtaining, by a receive end, a common transmission path network congestion identifier or a data receiving rate, wherein the common transmission path network congestion identifier indicates that network congestion is occurring on a common transmission path in a process of transmitting data from a transmit end to the receive end, and the transmit end and the receive end are comprised in the plurality of hosts;

determining, by the receive end, a network congestion scenario based on the common transmission path network congestion identifier or the data receiving rate; and sending, by the receive end, a first acknowledgment message to the transmit end, wherein the first acknowledgment message comprises a network congestion scenario identifier, and the network congestion scenario identifier indicates a scenario in which network congestion is occurring in the process of transmitting data from the transmit end to the receive end; and wherein the network congestion scenario identifier indicates that network congestion occurs at the receive end, a data flow transmitted by the transmit end to the receive end comprises at least one first-type data flow and at least one second-type data flow, the network congestion scenario identifier comprises a congestion factor, the congestion factor is calculated based on the at least one first-type data flow having a first weight, the at least one second-type data flow having a second weight, a length of a first flow table for the at least one first-type data flow, and a length of a second flow table for the at least one second-type data flow, and wherein the at least one first-type data flow and the at least one second-type data flow have different lengths; and wherein the congestion factor is equal to a sum of the length of the first flow table multiplied by the first weight and the length of the second flow table multiplied by the second weight, the length of the first flow table is a quantity of data flows recorded in the first flow table, and the length of the second flow table is a quantity of data flows recorded in the second flow table; and wherein the first flow table records a plurality of flows having a length larger than a threshold, the second flow table records a plurality of flows having a length smaller than the threshold, and the first weight is determined based on a difference between the threshold and an average length of the plurality of flows having the length larger than the threshold.

7. The method according to claim 6, wherein obtaining, by the receive end, the common transmission path network congestion identifier or the data receiving rate comprises:

obtaining, by the receive end, the common transmission path network congestion identifier and the data receiving rate.

8. The method according to claim 7, wherein determining, by the receive end, the network congestion scenario based on the common transmission path network congestion identifier or the data receiving rate comprises:

determining, by the receive end, the network congestion scenario based on the common transmission path network congestion identifier and the data receiving rate.

9. The method according to claim 6, further comprising obtaining the data receiving rate by:

initializing a timer;

counting, using a counter, a sum of data volumes of received data packets within a timing period of the timer; and obtaining the data receiving rate based on the timing period and the sum of data volumes of received data packets.

10. The method according to claim 6, further comprising:

maintaining, by the receive end, the first flow table for the at least one first-type data flow; and maintaining, by the receive end, the second flow table for the at least one second-type data flow.

11. The method according to claim 6, wherein the first weight is larger than the second weight.

12. A high-performance computing cluster, comprising:

a plurality of hosts connected via at least one network device, the plurality of hosts comprising a receive end and a transmit end;

wherein the receive end is configured to:

obtain a common transmission path network congestion identifier or a data receiving rate, wherein the common transmission path network congestion identifier indicates that network congestion is occurring on a common transmission path in a process of transmitting data from the transmit end to the receive end, and the transmit end and the receive end are comprised in the plurality of hosts;

determine a network congestion scenario based on the common transmission path network congestion identifier or the data receiving rate; and send a first acknowledgment message to the transmit end, wherein the first acknowledgment message comprises a network congestion scenario identifier, and the network congestion scenario identifier indicates a scenario in which network congestion is occurring in the process of transmitting data from the transmit end to the receive end; and wherein the transmit end is configured to:

obtain the first acknowledgment message; and adjust a data sending rate of the transmit end based on the network congestion scenario identifier; and wherein the network congestion scenario identifier indicates that network congestion occurs at the receive end, a data flow transmitted by the transmit end to the receive end comprises at least one first-type data flow and at least one second-type data flow, the network congestion scenario identifier comprises a congestion factor, the congestion factor is calculated based on the at least one first-type data flow having a first weight, the at least one second-type data flow having a second weight, a length of a first flow table for the at least one first-type data flow, and a length of a second flow table for the at least one second-type data flow, and wherein the at least one first-type data flow and the at least one second-type data flow have different lengths; and wherein the congestion factor is equal to a sum of the length of the first flow table multiplied by the first weight and the length of the second flow table multiplied by the second weight, the length of the first flow table is a quantity of data flows recorded in the first flow table, and the length of the second flow table is a quantity of data flows recorded in the second flow table; and wherein the first flow table records a plurality of flows having a length larger than a threshold, the second flow table records a plurality of flows having a length smaller than the threshold, and the first weight is determined based on a difference between the threshold and an average length of the plurality of flows having the length larger than the threshold.

13. The cluster according to claim 12, wherein the transmit end is configured to adjust, based on the congestion factor, a data sending rate at which the transmit end sends the first-type data flow.

14. The cluster according to claim 12, wherein the network congestion scenario comprises common transmission path network congestion, and the transmit end is configured to:

obtain a priority of a to-be-sent data flow; and adjust, based on the priority of the to-be-sent data flow, a rate at which the transmit end sends the data flow.

15. The cluster according to claim 14, wherein a priority of the at least one first-type data flow is higher than a priority of the at least one second-type data flow, and a rate at which the transmit end sends the at least one first-type data flow is higher than a rate at which the transmit end sends the at least one second-type data flow.

16. The cluster according to claim 12, wherein obtaining the common transmission path network congestion identifier or the data receiving rate comprises:

obtaining the common transmission path network congestion identifier and the data receiving rate.

17. The cluster according to claim 16, wherein determining the network congestion scenario based on the common transmission path network congestion identifier or the data receiving rate comprises:

determining the network congestion scenario based on the common transmission path network congestion identifier and the data receiving rate.

18. The cluster according to claim 12, wherein the first weight is larger than the second weight.

19. The cluster according to claim 12, wherein the cluster has a Dragonfly+ topology.

20. The cluster according to claim 12, wherein the cluster has a FatTree topology.

* * * * *